United States Patent [19]

Welk

[11] 4,263,635
[45] Apr. 21, 1981

[54] METHOD AND APPARATUS FOR SENSING THE CLEARANCE OF FAULT CURRENT ON AN AC TRANSMISSION LINE

[76] Inventor: Steven Welk, Valley Stream Apartments M202, Lansdale, Pa. 19466

[21] Appl. No.: 72,905

[22] Filed: Sep. 6, 1979

Related U.S. Application Data

[63] Continuation of Ser. No. 817,349, Jul. 20, 1977, abandoned.

[51] Int. Cl.³ .............................................. H02H 3/06
[52] U.S. Cl. ..................................... 361/71; 361/94; 361/110; 361/58
[58] Field of Search ....................... 361/71, 72, 73, 74, 361/110, 111, 58, 59, 9, 10, 75, 87, 88, 90, 4, 5, 11, 12, 23, 33, 93, 94; 307/134, 135

[56] References Cited

U.S. PATENT DOCUMENTS

| 3,530,360 | 9/1970 | Relation ............................. 361/58 X |
| 3,609,461 | 9/1971 | Obenhaus et al. ..................... 361/94 |
| 3,878,436 | 4/1975 | Bogel .................................... 361/72 |
| 3,982,158 | 9/1976 | Knauer ................................. 361/9 X |
| 4,084,204 | 4/1978 | Jacobus, Jr. ........................... 361/59 |

Primary Examiner—Patrick R. Salce
Attorney, Agent, or Firm—Flehr, Hohbach, Test, Albritton & Herbert

[57] ABSTRACT

A method and apparatus for sensing the clearance of a fault current on an ac transmission line and providing a fault cleared signal for closing a current limiter bypass switch includes the technique of successively sensing half cycles of current magnitudes of the system after establishing a predetermined fault current threshold and producing a fault clear signal only when a signal indicating the threshold has been exceeded is followed by two subsequent signals indicating that the threshold has not been exceeded by the two half cycles of current.

7 Claims, 4 Drawing Figures

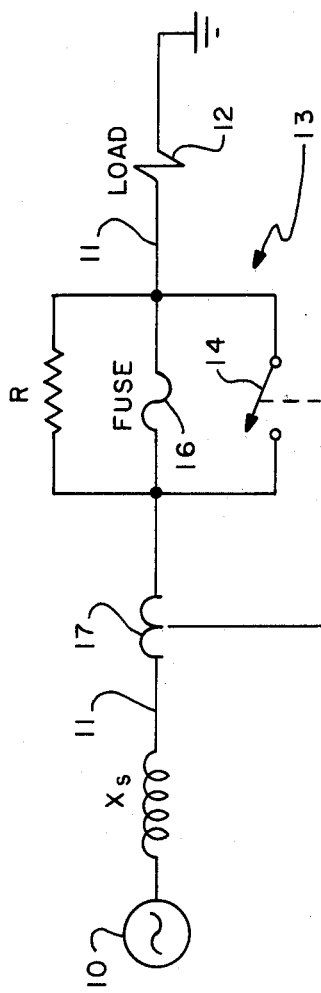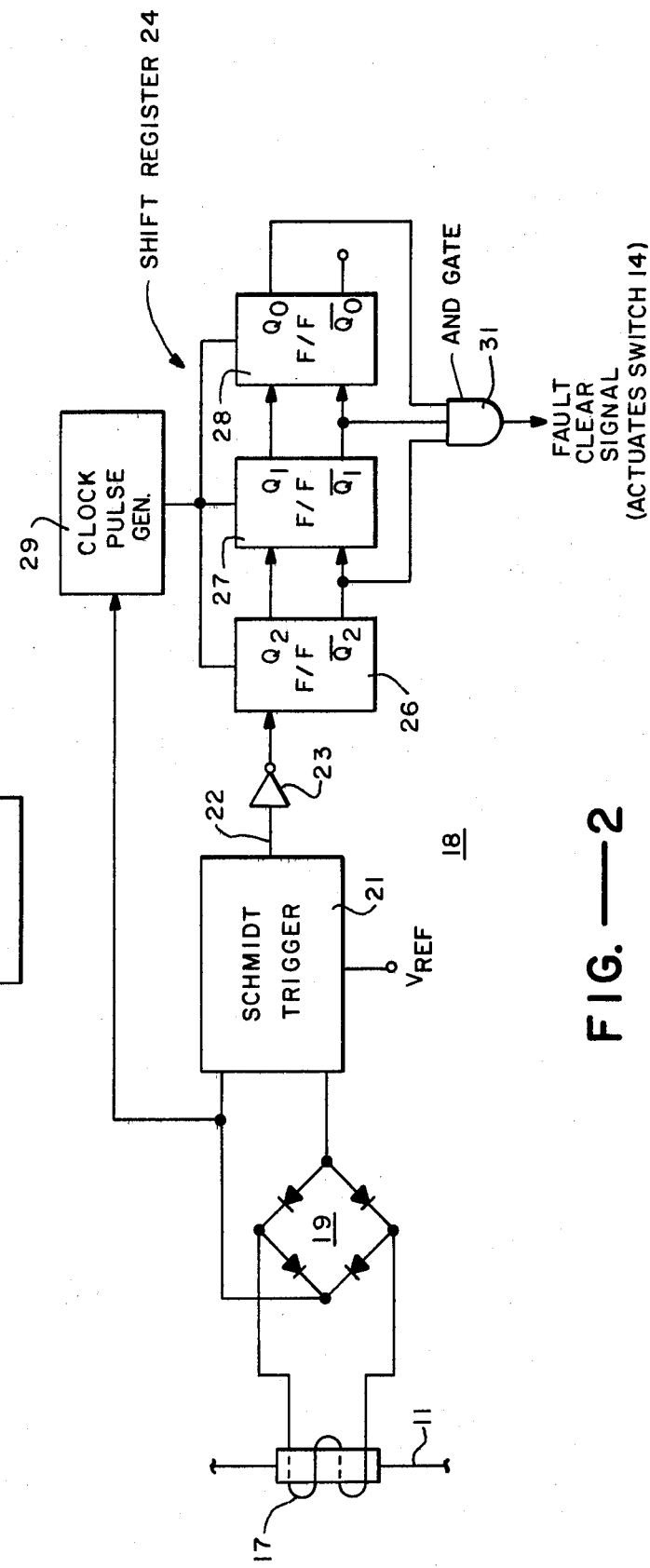
FIG.—1
FIG.—2

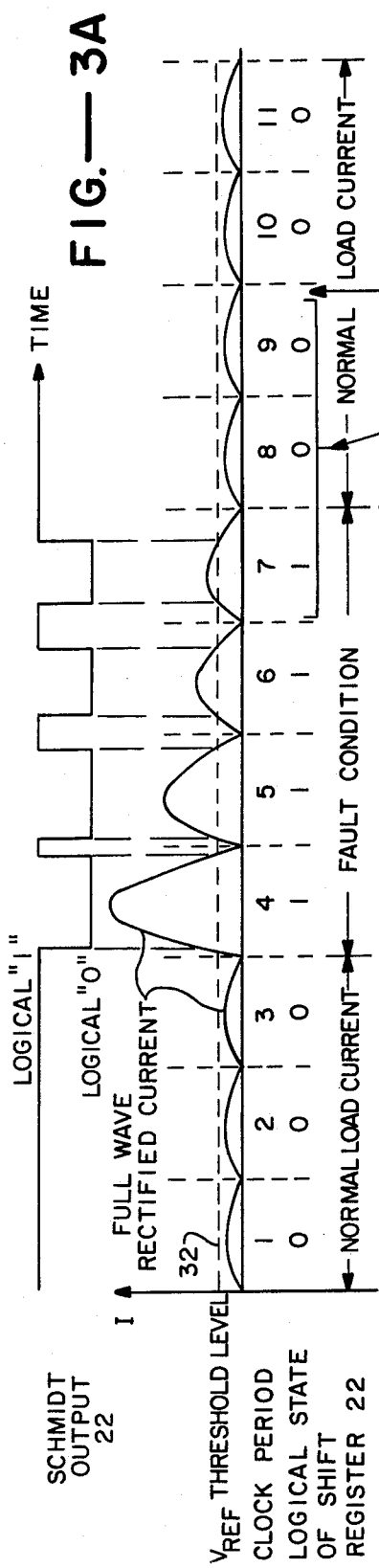
FIG.—3A
FIG.—3B
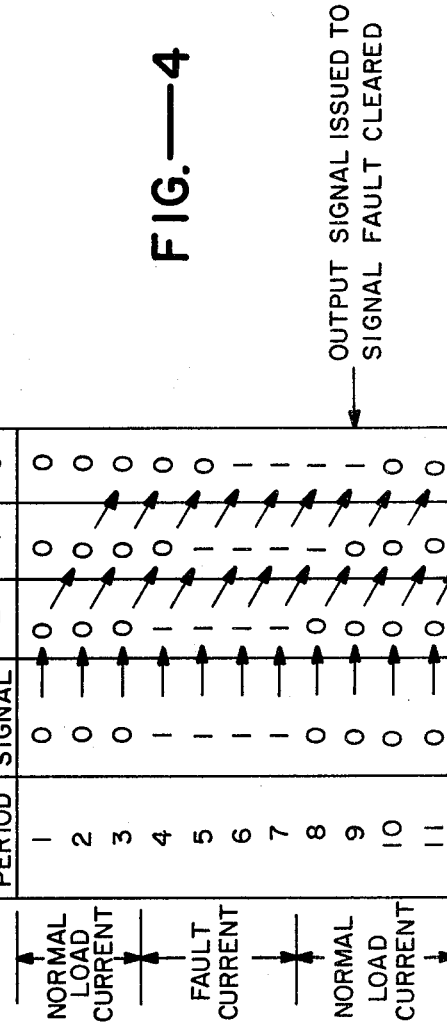
FIG.—4

METHOD AND APPARATUS FOR SENSING THE CLEARANCE OF FAULT CURRENT ON AN AC TRANSMISSION LINE

This is a continuation of application Ser. No. 817,349 filed July 20, 1977, now abandoned.

BACKGROUND OF THE INVENTION

The present invention is directed to a method and apparatus for sensing the clearance of fault current on an ac transmission line.

In power transmission systems the growth of fault current levels has been nearly geometric. Because of the large magnitude of the fault current, the "brute force" solution of using ever larger circuit breakers no longer works; the largest breakers available will not meet anticipated interrupting requirements.

One solution is a fault current limiter which is series connected in the transmission line and reduces fault current to a low enough level so that normal circuit breakers can be used. Such limiters are discussed in an article entitled "Fault Current Limiters: Problems and Prospects" in *EPRI Journal* (Electric Power Research Institute), February 1976, pp. 14–19 by Richard Kennon.

In fault current limiting a basic problem is the reliable determination that a fault in a particular power circuit has been effectively cleared. This determination must be made as quickly as possible so that necessary electromechanical devices such as a fault current limiter bypass switch can be activated. Specifically, the fault current limiter is momentarily dissipating megawatts of energy and thus must be quickly shunted after the fault condition has been cleared.

The most difficult sensing discrimination occurs when the placement of the fault current limiter in the power system allows normal load current to continue to flow immediately after fault current interruption. This prohibits the use of any type of "zero current" sensing technique.

OBJECTS AND SUMMARY OF THE INVENTION

It is, therefore, an object of the present invention to provide a method and apparatus for sensing the clearance of fault current on an ac transmission line.

It is a more specific object to provide a method and apparatus as above which is simple and reliable and which operates in a minimum of 60 Hz cycle time.

In accordance with the above objects there is provided a method of sensing the clearance of a fault current on an ac transmission line having a normal current. A parameter of the current indicative of either a fault and a normal condition is sensed on a periodic basis. A fault cleared signal is produced only when the parameter sensed is indicative of the fault condition followed periodically by at least one parameter indicative of the normal condition.

In addition, apparatus is also provided for sensing the clearance of a fault current from an ac transmission line which has a predetermined fault threshold level demarcating normal and fault conditions. A current transformer is connected to the transmission line. Means are provided for comparing the current magnitude output of the rectifier to the fault threshold level and indicating a normal or fault condition. Logic means are responsive to a fault condition indication followed in time by at least one normal condition indication for producing a fault cleared signal.

BRIEF DESCRIPTION OF THE DRAWINGS

FIG. 1 is a circuit schematic of a basic scheme for fault current limiting in which the present invention is utilized;

FIG. 2 is a more detailed logic block diagram of a portion of FIG. 1 illustrating the present invention;

FIGS. 3A and 3B are waveforms useful in understanding the operation of the invention; and FIG. 4 is a table useful in understanding the operation of the invention.

DETAILED DESCRIPTION OF THE PREFERRED EMBODIMENT

FIG. 1 illustrates a typical transmission line 11 with a generator 10 having a source impedance $X_S$, a load 12 and a ground termination. In series with transmission line 11 is a fault current limiter 13 which consists of a high resistance R, a bypass switch 14 and a commutating element 16 which in the preferred embodiment is a fuse. The current transformer 17 senses the current magnitude in the line and is connected to a sensor unit 18 which drives bypass swtich 14.

As discussed in the foregoing Kennon article in the *EPRI Journal*, switch 14 is normally closed to provide a path for load current. When a fault is sensed, the switch is opened to transfer current into the commutating element which in this case is fuse 16. The fuse melts and forces the fault current through resistor R which limits current and absorbs energy. When the current drops to a low enough level, circuit breakers drop off load portions from the transmission line to bring the line current back towards a normal level. Sensor 18 by means of current transformer 17 senses this normal level to again close bypass switch 14 allowing resistor R to dissipate its accumulated heat.

The details of sensor 18 as they relate to closing the bypass switch 14 after the current has returned to a normal level is shown in accordance with the present invention in FIG. 2. Current transformer 17 has its output fed to a full wave rectifier 19 which drives a regenerative comparator of Schmidt trigger 21. A Schmidt trigger, as is well-known in the art, has a rectangular wave output on line 22 which switches state when the input signal exceeds a predetermined threshold level designated $V_{REF}$. When input signal falls below the threshold level the Schmidt trigger output changes back to the opposite state.

Output 22 after being inverted at 23 drives a shift register 24 which includes flip-flops 26, 27 and 28. Shift register 24 may also be thought of as a sequential holding circuit with each of the individual flip-flops being a single holding unit which sequentially in time holds the inverted output of the Schmidt trigger. Timing is provided by clock pulse generator 29 which is synchronized with the 60 Hz line frequency. The contents of the shift register are examined in parallel by AND gate 31 with the AND gate producing an output, which is a fault clear signal, for actuating switch 14 only when the $\overline{Q}$ outputs of flip-flops 26 and 27 are high and the Q output of flip-flop 28 is high. The Q outputs of the flip-flops are designated $Q_0$, $Q_1$ and $Q_2$, $Q_0$ being first in time and $Q_1$ and $Q_2$ subsequent in time.

FIG. 3B illustrates a typical sequence of operation where in the first three clock periods there is a normal load current condition. A fault condition occurs in clock period 4 and, referring to FIG. 1, the fault current limiter is switched in the circuit in time period 5. After various actions have taken place the fault is finally cleared at the end of clock period 7. The horizontal dashed line 32 in FIG. 3B indicates a fault current threshold level which is a demarcation between normal line current and a fault current condition. This is the $V_{REF}$ voltage input of the Schmidt trigger 21 (FIG. 2). Thus the output 22 of the Schmidt trigger is shown in FIG. 3A and goes to a logical zero each time the magnitude of the line circuit (or a proportional amount as determined by current transformer 17) exceeds the threshold level. The fault condition continues to be indicated by the Schmidt output 22 through the time period 7 until time period 8 when it remains in a logical 1 or high condition continuously.

Inverter 23 (FIG. 2) inverts the output of Schmidt trigger 22 and its output is indicated as the "Logical state of shift register 24".

Shift register 24 and its associated AND gate 31 form a logic circuit which will only issue a fault clear signal output if the signal indicating the threshold has been exceeded (i.e., the "one" logical state in clock period 7) is followed by two subsequent signals indicating that the threshold has not been exceeded by the half cycles of current (i.e., periods 8 and 9 with "0" logical states). No other sequence or combination of signals will cause the logic circuit to produce a fault clear signal output. This is clearly indicated by the table of FIG. 4, and also referring to FIG. 3B, which shows all of the possible logical states of the various flip-flops in the shift register. Only during period 9 is the foregoing condition fulfilled; that is, "001". Thus referring to the $Q_2$, $Q_1$ and $Q_0$ outputs of the shift register 24 in FIG. 2 the $\overline{Q}_1$ and $\overline{Q}_2$ outputs must be true or high or logical one and the $Q_0$ output high or logical one.

A NAND gate could be substituted for the AND gate 31 provided that its inputs are taken from the $Q_2$, $Q_1$ and $Q_0$ outputs instead of $\overline{Q}_2$, $\overline{Q}_1$ and $Q_0$. Thus, the choice of an AND or NAND gate is a design option, whereas the concurrent responsiveness of the logic gate to said memory locations is a critical feature.

In summary, the circuit provides a fault clear signal and actuation of the bypass switch in two half cycles or 16.6 milliseconds after the line current falls below the threshold level demarcating normal and fault current.

It is apparent from examination of FIG. 3B and the table of FIG. 4 that only a single half cycle of normal load current rather than two half cycles could be used to sense the clearance of a fault condition; however the two half cycles of normal current provide for greater reliability of operation. Increased reliability could be obtained by using more than two half cycles of normal load current to sense the clearance of a fault condition.

What is claimed is:

1. A method of sensing the clearance of a fault current on an AC transmission line where there has been established a predetermined fault threshold level of current which, if the line current is greater than said threshold level a fault is considered to exist and if less than said threshold level the line current is normal comprising the following steps: sensing a line current greater than said threshold level; thereafter, on a periodic basis sensing a line current less than said threshold level; and thereafter during a later periodic time again sensing a line current less than said threshold level and producing a fault cleared signal.

2. A method as in claim 1 where said transmission line includes a fault current limiter and a bypass switch for such limiter and including the step of closing said switch to bypass said limiter in response to production of said fault cleared signal.

3. Apparatus for sensing the clearance of a fault current from an AC transmission line and including a non-reusable commutating element for switching fault current through a current limiter comprising: a current transformer connected to said transmission line having a current magnitude output proportional to the current carried by said transmission line; rectifier means connected to the output of said current transformer; reference means for providing a signal related to a predetermined fault threshold level of said transmission line; means for comparing the current magnitude output of said rectifier means to said signal of said reference means during at least a fault condition where said line current is flowing through said current limiter and indicating whether said line current is greater or less than said fault threshold level; and logic means responsive only to a first indication from said comparing means that said line current is greater than said fault threshold level followed in time by at least two subsequent indications from said comparing means that said line current is less than said fault threshold level for producing a fault cleared signal.

4. Apparatus as in claim 3 where said rectifier means is a full wave bridge.

5. Apparatus as in claim 3 where said comparing means is a Schmidt trigger circuit and said reference means signal is a voltage reference for said trigger circuit.

6. Apparatus for sensing the clearance of a fault current from an AC transmission line having a predetermined fault threshold level demarcating normal and fault conditions and including a non-reusable commutating element for switching fault current through a current limiter comprising: a current transformer connected to said transmission line; rectifier means connected to the output of said current transformer; means for comparing the current magnitude output of said rectifier means to said fault threshold level and indicating a normal or a fault condition; and logic means responsive only to a fault condition indication followed in time by at least two normal condition indications for producing a fault cleared signal, said logic means including a shift register having a plurality of memory locations for sequentially storing said indications.

7. Apparatus as in claim 6 where said logic means includes a logic gate concurrently responsive to said memory locations.

* * * * *

UNITED STATES PATENT AND TRADEMARK OFFICE
CERTIFICATE OF CORRECTION

PATENT NO. : 4,263,635
DATED : April 21, 1981
INVENTOR(S) : STEVEN WELK

It is certified that error appears in the above-identified patent and that said Letters Patent are hereby corrected as shown below:

On the first page of the patent, add the following:

---Assignee: Electric Power Research Institute, Palo Alto, California---

Signed and Sealed this

Eighth Day of December 1981

[SEAL]

Attest:

Attesting Officer

GERALD J. MOSSINGHOFF

*Commissioner of Patents and Trademarks*